L. P. HALLADAY.
SUPPORT FOR AUTOMOBILE BUMPERS.
APPLICATION FILED JULY 30, 1919.
1,344,796.
Patented June 29, 1920.
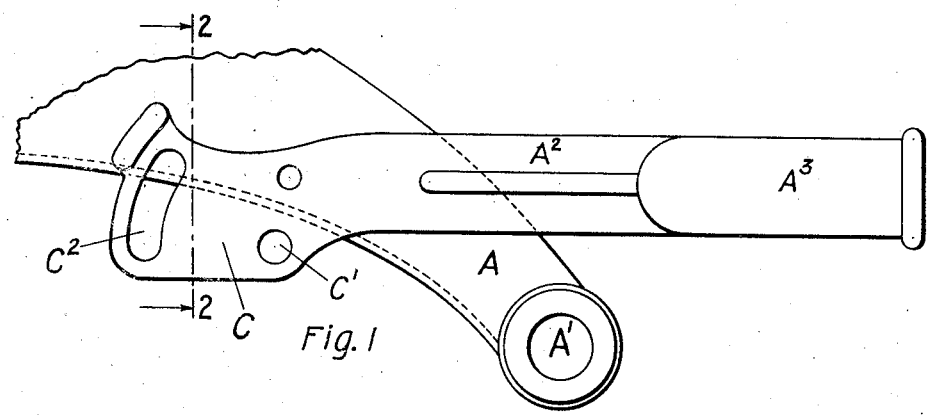
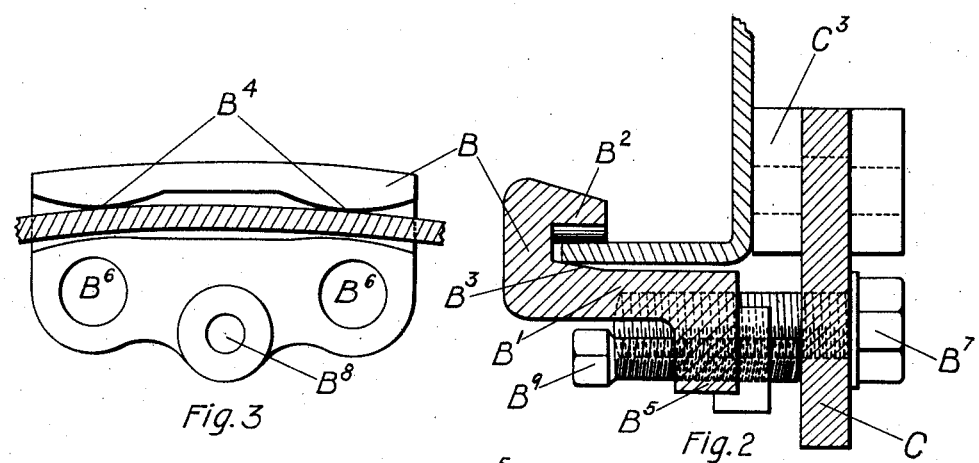
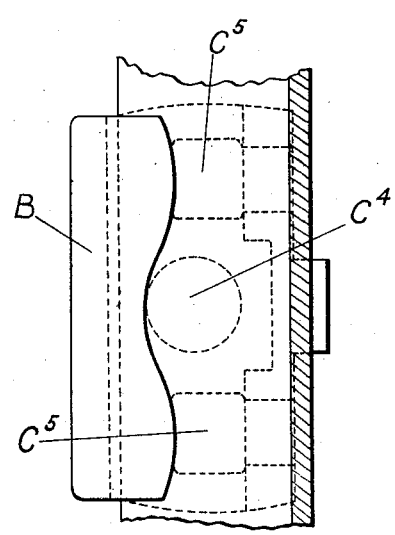
Witness: W. P. Ireland.
Inventor
Lewis P. Halladay
By Parker & Carter
Attorneys

UNITED STATES PATENT OFFICE.

LEWIS P. HALLADAY, OF STREATOR, ILLINOIS.

SUPPORT FOR AUTOMOBILE-BUMPERS.

1,344,796. Specification of Letters Patent. Patented June 29, 1920.

Application filed July 30, 1919. Serial No. 314,298.

*To all whom it may concern:*

Be it known that I, LEWIS P. HALLADAY, a citizen of the United States, residing at Streator, in the county of La Salle and State of Illinois, have invented a certain new and useful Improvement in Supports for Automobile-Bumpers, of which the following is a specification.

My invention relates to improvements in automobile bumpers and refers particularly to the means for attaching or supporting the bumpers to the automobile frame.

Many modern automobiles have a sleeve apron extending down in front of the radiator and between the frame horns, and this makes it impossible to fasten the bumper to the upper surface of the frame where it projects beyond the front of the radiator. It is necessary, therefore, to provide means which will engage the under edge of the channel and permit a bumper bracket to extend forward along the outside of the frame horn.

This necessitates, however, only engaging one side of the frame and makes it impossible to grip both sides, and it is necessary, therefore, to add special means to insure that the grip of the lower flange and side of the frame be close and accurate and permanent to prevent displacement of the bumper.

My invention is illustrated more or less diagrammatically in the accompanying drawings wherein:

Figure 1 is a side elevation of a part of the automobile frame showing the bumper bracket in place;

Fig. 2 is a section along the line 2 2 of Fig. 1, the parts broken away;

Fig. 3 is a side elevation of the flange engaging hook showing the flange itself in section;

Fig. 4 is a plan view of the hook with flange in section;

Like parts are indicated by like characters in all the figures.

A is an automobile frame having at its front end, the eye A' to which the usual spring bolt may be attached. This frame extends forward beyond the automobile radiator which together with other automobile parts, is not shown, as none of them form any part of my invention. $A^2$ is a bracket arm projecting forwardly beyond the front end of the frame and terminating in a buffer socket portion $A^3$ which is adapted to be attached, by means not here shown, to an ordinary automobile bumper.

B is a flange engaging hook having a lower portion B' adapted to underlie the flange and an upper hook-like clamp portion $B^2$ adapted to overlie the edge of the flange. The upper surface of the under portion B' immediately beneath the hook portion $B^2$ is upwardly inclined as at $B^3$ to engage the edge of the flange and the under portion of the hook $B^2$ is provided with spaced, downwardly extending bearing members $B^4$ positioned so as to get two separated bearing surfaces on the flange independent of its curvature, to be used within a reasonable limit. The upper surface of the part $B^2$, it will be noted, is convex to provide a clearance independent of the curvature of the flange, and is flattened toward the center as indicated, so as to make the engagement of the flange take place both above and below, at two points adjacent the engaging members, $B^4$. The forward edge of the hook B is provided with the downwardly extending flange $B^5$. This flange has, at either end, large screw threaded apertures $B^6$ adapted to be engaged by cap screws $B^7$ and a centrally disposed screw threaded aperture $B^8$ farther from the flange than the apertures $B^6$, adapted to provide a screw threaded support for a set screw $B^9$.

Extending downwardly from the bracket $A^2$ is a flange C having one circular aperture C' toward the forward end adapted to engage one of the cap screws $B^7$. Toward the rear is a curved slot $C^2$ concentric with the aperture C' adapted to contain the other cap screw $B^7$, so as to permit rotational movement of the bracket about the forward cap screw $B^7$, between limits marked out by the length of the curved slot $C^3$. $C^3$ are bearing lugs on the inner side of the bracket plate $A^2$ adapted to rest against the outer surface of the frame. The set screw $B^9$ is adapted to engage the smooth surface of the flange C and provide an abutment against which tightening of the cap screws may work. $C^5$ $C^5$ are pockets cored out in the hook B to provide clearance for the cap screws and $C^4$ is an aperture through the hook to provide lightness and prevent undue deposition of foreign material from the road.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

The use and operation of my invention are as follows:

The bracket and hook will normally come to the hand of the fitter in a loosely assembled condition with the two cap screws and the set screw in place as indicated. By loosening up the cap screws, it will be possible for the assembler to engage the hook with the inner edge of the flange so that the short inwardly bent portion overlies the upper surface of the flange at its edge and so that the broad laterally extended part of the hook rests beneath the flange. When in this position, the frame engaging member on the bracket can be brought generally into engagement therewith. The set screw will then be moved forward to bring it into engagement with the downwardly depending flange on the bracket so as to hold the flange just a little out from plane of the outer wall of the frame. The central cap screw will then be tightened up a little and the hook and supporting members moved back and forth until by rotating the bracket about the central cap screw with the rear screw loose, the fitter is able to position the bumper bracket so that it projects beyond the frame and is in a horizontal plane. This can be done, of course, because the varying curvature of the horn of the frame at different points, as well as the pivotal adjustment of the bracket itself, can be positioned to utilize the parts. When the bracket has been placed in the proper position, the two cap screws are strongly tightened up and tend to pull the hook over onto the frame and wedge the edge of the flange into the tapered pocket at the base of the hook, and at the same time tend to twist the bracket inwardly so that its upper bearing portion smoothly engages the outer wall of the frame horn.

I claim:

1. A support for automobile bumpers comprising a bracket adapted to engage one side of the frame, a hook separate therefrom adapted to engage one of the frame flanges, and means for drawing the hook and bracket together to clamp them on the frame, the hook being in contact with the frame only at the edge of the flange thereof, the bracket being in contact with the frame only on the side thereof perpendicular to the flange engaged by the hook.

2. A support for automobile bumpers comprising a bracket adapted to engage one side of the frame, a hook separate therefrom adapted to engage one of the frame flanges at a plurality of points therealong, and means for drawing the hook and bracket together to clamp them on the frame.

3. A support for automobile bumpers comprising a bracket adapted to engage one side of the frame, a hook separate therefrom adapted to engage one of the frame flanges at two spaced points, and means for drawing the hook and bracket together to clamp them on the frame.

4. A support for automobile bumpers comprising a bracket adapted to engage one side of the frame, a hook separate therefrom adapted to engage one of the frame flanges and means for drawing the hook and bracket together to clamp them on the frame, the hook being provided with an inclined surface adapted to wedge against the edge of the flange as the hook is tightened thereon, the hook being in contact with the frame only at the edge of the flange thereof, the bracket being in contact with the frame only on the side thereof perpendicular to the flange engaged by the hook.

5. A support for automobile bumpers comprising a bracket adapted to engage one side of the frame, a hook separate therefrom adapted to engage one of the frame flanges, at a plurality of points therealong, and means for drawing the hook and bracket together to clamp them on the frame, the hook being provided with an inclined surface adapted to wedge against the edge of the flange as the hook is tightened thereon.

6. A support for automobile bumpers comprising a bracket adapted to engage one side of the frame, a hook separate therefrom adapted to engage one of the frame flanges at two spaced points, and means for drawing the hook and bracket together to clamp them on the frame, the hook being provided with an inclined surface adapted to wedge against the edge of the flange as the hook is tightened thereon.

7. A support for automobile bumpers comprising a bracket adapted to engage one side of the frame, a hook separate therefrom adapted to engage one of the frame flanges, and means for drawing the hook and bracket together to clamp them on the frame, said means comprising a plurality of cap screws joining the hook and bracket, adapted to draw them together.

8. A support for automobile bumpers comprising a bracket adapted to engage one side of the frame, a hook separate therefrom adapted to engage one of the frame flanges at a plurality of points therealong, and means for drawing the hook and bracket together to clamp them on the frame, said means comprising a plurality of cap screws joining the hook and bracket, adapted to draw them together.

9. A support for automobile bumpers comprising a bracket adapted to engage one side of the frame, a hook separate therefrom adapted to engage one of the frame flanges at two spaced points, and means for drawing the hook and bracket together to clamp them on the frame, said means comprising a plurality of cap screws joining the hook and bracket, adapted to draw them together.

10. A support for automobile bumpers comprising a bracket adapted to engage one side of the frame, a hook separate therefrom adapted to engage one of the frame flanges, and means for drawing the hook and bracket together to clamp them on the frame, and an adjustable abutment interposed between the hook and bracket adapted to limit their movement toward one another at a point removed from the frame so as to insure a positive engagement of the frame with the hook and bracket.

11. A support for automobile bumpers comprising a bracket adapted to engage one side of the frame, a hook separate therefrom adapted to engage one of the frame flanges at a plurality of points therealong, and means for drawing the hook and bracket together to clamp them on the frame, and an adjustable abutment interposed between the hook and bracket adapted to limit their movement toward one another at a point removed from the frame so as to insure a positive engagement of the frame with the hook and bracket.

12. A support for automobile bumpers comprising a bracket adapted to engage one side of the frame, a hook separate therefrom adapted to engage one of the frame flanges at two spaced points, and means for drawing the hook and bracket together to clamp them on the frame, and an adjustable abutment interposed between the hook and bracket adapted to limit their movement toward one another at a point removed from the frame so as to insure a positive engagement of the frame with the hook and bracket.

13. A support for automobile bumpers comprising a bracket adapted to engage one side of the frame, a hook separate therefrom adapted to engage one of the frame flanges, and means for drawing the hook and bracket together to clamp them on the frame, and an adjustable abutment interposed between the hook and bracket adapted to limit their movement toward one another at a point removed from the frame so as to insure a positive engagement of the frame with the hook and bracket, said abutment comprising a set screw, screw-threaded in one and engaging the other.

14. A support for automobile bumpers comprising a bracket adapted to engage one side of the frame, a hook separate therefrom adapted to engage one of the frame flanges, at a plurality of points therealong, and means for drawing the hook and bracket together to clamp them on the frame, and an adjustable abutment interposed between the hook and bracket adapted to limit their movement toward one another at a point removed from the frame so as to insure a positive engagement of the frame with the hook and bracket, said abutment comprising a set screw, screw-threaded in one and engaging the other.

15. A support for automobile bumpers comprising a bracket adapted to engage one side of the frame, a hook separate therefrom adapted to engage one of the frame flanges at two spaced points, and means for drawing the hook and bracket together to clamp them on the frame, and an adjustable abutment interposed between the hook and bracket adapted to limit their movement toward one another at a point removed from the frame so as to insure a positive engagement of the frame with the hook and bracket, said abutment comprising a set screw, screw-threaded in one and engaging the other.

16. A support for automobile bumpers comprising a bracket adapted to engage one side of the frame, a hook separate therefrom adapted to engage one of the frame flanges, said hook comprising a curved plate, a downwardly extended flange parallel with the bracket and an upwardly and inwardly extending curved flange adapted to overhang the frame, and means for drawing the hook and bracket together to clamp them on the frame.

17. A support for automobile bumpers comprising a bracket adapted to engage one side of the frame, a hook separate therefrom adapted to engage one of the frame flanges, said hook comprising a curved plate, a downwardly extended flange parallel with the bracket and an upwardly and inwardly extending curved flange adapted to overhang the frame, the frame engaging projections extending downwardly from the under side of the hook portion adapted to engage the upper surface of the flange at two points only, the hook being cut away above and below so as to insure only such two point engagement, independent of variations in the curvature of the flange, and means for drawing the hook and bracket together to clamp them on the frame.

In testimony whereof I affix my signature in the presence of two witnesses this 18th day of July, 1919.

LEWIS P. HALLADAY.

Witnesses:
E. R. WILLIAMS,
G. G. HOOD.